Sept. 25, 1945.　　　D. SAMIRAN　　　2,385,382
SAFETY DEVICE FOR GASOLINE OR OIL GAUGES
Filed July 13, 1944　　2 Sheets-Sheet 1

INVENTOR.
DAVID SAMIRAN
BY
ATTORNEYS

Sept. 25, 1945.　　　　D. SAMIRAN　　　　2,385,382
SAFETY DEVICE FOR GASOLINE OR OIL GAUGES
Filed July 13, 1944　　　2 Sheets-Sheet 2

INVENTOR.
DAVID SAMIRAN
ATTORNEYS

Patented Sept. 25, 1945

2,385,382

UNITED STATES PATENT OFFICE 2,385,382

SAFETY DEVICE FOR GASOLINE OR OIL GAUGES

David Samiran, Osborn, Ohio

Application July 13, 1944, Serial No. 544,805

3 Claims. (Cl. 73—395)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to safety devices for gasoline or oil lines and is particularly effective in minimizing the fire hazard due to breaks in the lines which convey such liquids under pressure to their gauges.

Many power driven vehicles, including land, sea and aircraft, are operated on liquid fuel which is brought to the engine under pressure, and it is usual to provide a gauge conveniently located within the view of the operator to indicate the fuel pressure existing at all times during operation. Many of these gauges require that a fuel line be brought to them on the instrument panel which is always close to, and usually in front of, the operator. When such a fuel line breaks during operation, the pilot or driver and his surroundings are often sprayed with this inflammable liquid before steps can be taken to shut it off, since the pump supplying the fuel will continue to force fuel into the line and out at the break.

It is therefore an object of this invention to overcome this objection by providing a device which may be located as remotely from the operator as practicable and which will transfer the pressure of the liquid fuel in the high pressure side of the system through a noninflammable or less inflammable fluid which will be contained in the line which extends from the more remote device to the proximate gauge.

It is a further object to so construct and arrange the device that when the gauge line or the gauge, which usually both contain a portion of the transfer fluid, does break, there is no connection between the break and the high pressure side of the system, and consequently, no loss of fuel, or of pressure in the line containing the fuel, and only a small volume of the transfer fluid in the device will be ejected from the break and be lost.

More specifically, an object of the invention is to provide a device of this character in which a pressure tight fluid containing receptacle is divided into two compartments which are separated by a flexible or yieldable partition which positively seals one compartment against leakage into the other, and in which the one compartment is connected to the high pressure side of the fuel system, whereby it is filled with the inflammable liquid fuel under pressure, while the other is filled with a transfer liquid which necessarily extends also through the gauge line to and into the gauge, whereby the pressure of the inflammable fuel in the one compartment is transferred by the yieldable partition to the gauge through the transfer fluid, which is in the other compartment and in the gauge line and the gauge.

Another specific object is to provide a filling means whereby the flexible or yieldable partition may be held in a selected non-yielding position between the two compartments while the fuel compartment is not under pressure and the transfer compartment and the gauge line and gauge are being filled with the transfer fluid, to the end that the partition will not be unduly flexed to enlarge the transfer compartment at the expense of the fuel compartment.

Another object is to provide a unique locking means for holding the filling means in the operative or inoperative position as desired.

Other objects and advantages will be seen as the invention is more fully described with reference to the drawings, wherein, Fig. 1 is a vertical axial section through the device taken at 1—1 of Fig. 2.

Figure 1:
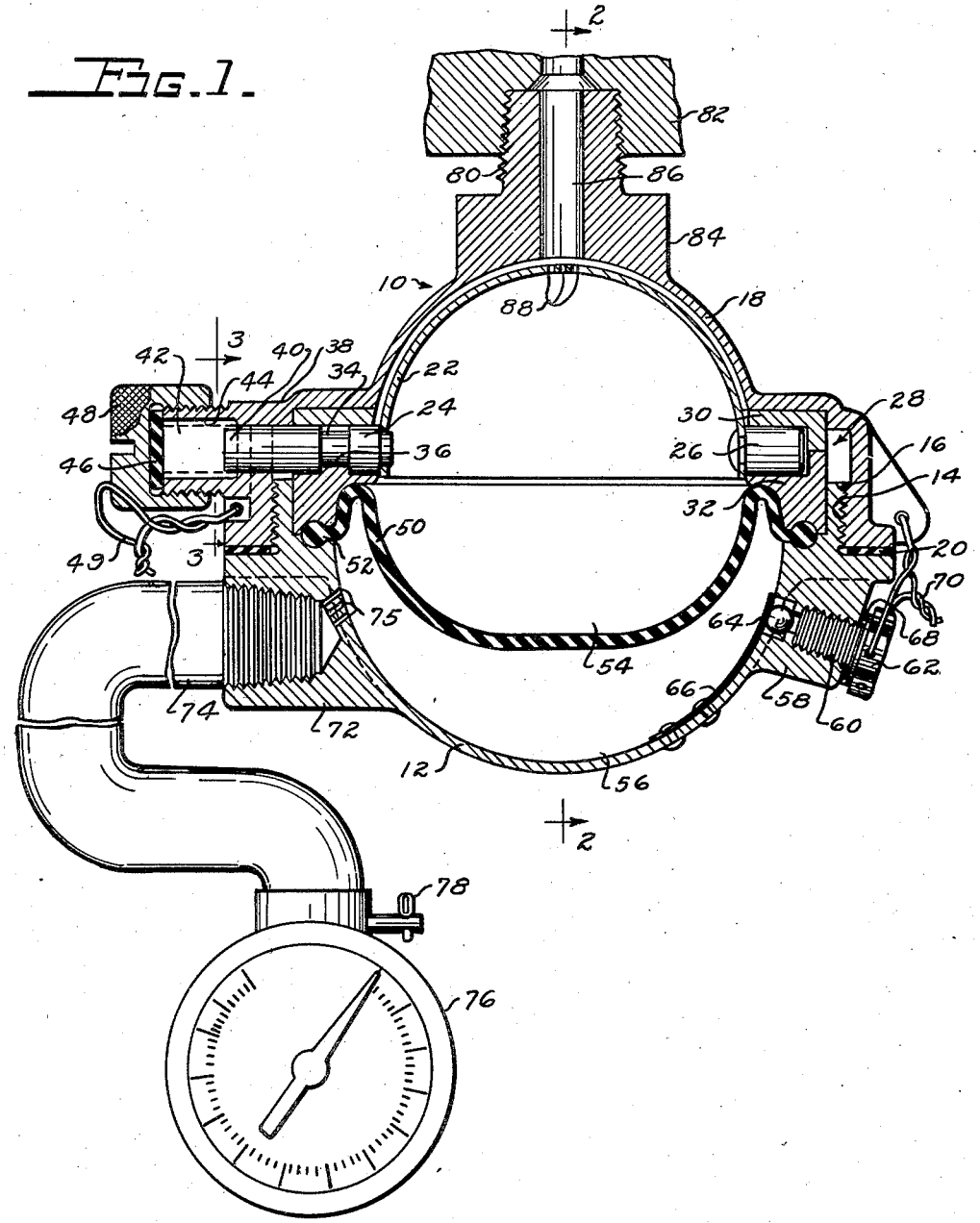
Figure 2:
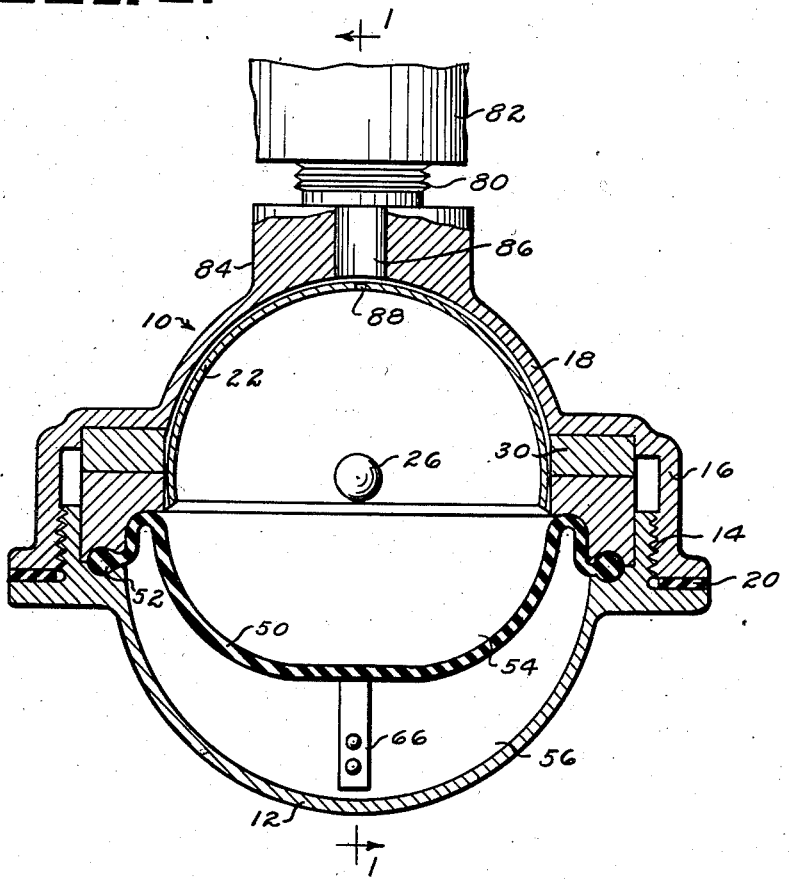
Fig. 2 is a section taken at 2—2 of Fig. 1 normal to the axis.
Figure 3:
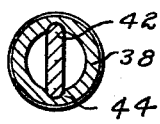
Fig. 3 is a section taken at 3—3 of Fig. 1 through the locking means.

Referring to Figs. 1 and 2 of the drawings, the pressure transfer device, here shown, comprises a housing 10 in which a lower half 12 is externally threaded as at 14 to receive the internal threads 16 of the upper half of the housing 18. A gasket 20 is placed between the interfacing surfaces of the parts 12 and 18 to make a pressure tight seal.

Nested in the dome-shaped top of the housing 18 is a semispherical shell 22 which is rotatable within the housing on journals 24 and 26, which have their bearing in a ring member 28 which is also made up of an upper half 30 and a lower half 32. Journal 24 is necked in at 34 and a tongue 36 extends upwardly into this necked-in portion to prevent axial movement of the journal 24 in the ring member 32. The journal 24 extends outwardly beyond the ring 28 into a hub 38 which is an integral part of the upper half 18 of the housing. The end of the journal 24, where it extends into the hub 38, is slotted vertically, as at 40, to receive the flat key 42 which is held against rotation by having rounded edges which extend into the semi-circular key ways 44 on the inside of the hub 38. A gasket 46 is held by a nut 48 against the end of the hub 38 to effect a pressure tight seal at this point. A locking wire 49 prevents loosening of the nut 48 when proper adjustment has been made.

Within the housing 10, intermediate its upper and lower portions 18 and 12, a flexible diaphragm 50, preferably made of synthetic rubber, reinforced with nylon to fortify it against breaking at low temperature, is held by a bead 52 between the ring 28 and the lower half 12, semicircular grooves being provided in these parts to receive the bead. Diaphragm 50 divides the housing 10 into compartments 54 and 56. A hub 58 has an opening 60 which is internally threaded for the plug 62, this opening being provided for filling the compartment 56 with the transfer liquid. A check valve comprises a ball 64 which is held on its seat by a flat spring 66, this valve being provided to hold the liquid in the compartment 56 until the plug 62 may be screwed into place. A gasket 68 under the head of the plug 62 insures a pressure tight joint. A wire seal 70 holds the plug 62 from turning once it has been seated on the gasket.

A second hub 72 extends from the lower half of the housing 12 and is internally threaded for the pipe 74, which connects the pressure gauge 76 with the compartment 56 of the housing. A small bleeder valve 78 may be provided to permit the escape of air when filling the compartment 56. Small holes 75 are provided for connecting the compartment 56 to the end of the pipe 74.

Extending from the upper half 18 of the housing is a threaded part 80 which is screwed into the carburetor 82, a hexagon hub 84 being provided for this purpose. An opening 86 through the hub 84 connects the carburetor to the compartment 54. Small holes 88 extend through the shell 22 so that the liquid fuel may have free access from the carburetor into the chamber compartment 54.

The operation of the device illustrated in Figs. 1 and 2 is as follows:

Before filling the compartment 56, the cap 48, gasket 46 and key 42 are removed, and, with a screw driver extending into the slot 40, the journal 24 is rotated a half turn so that the semispherical shell 22 will arch downward instead of upward, thereby substantially touching the upper concaved surface of the diaphragm 50. When this position is reached by the shell, the plug 62 and gasket 68 are removed, the bleeder valve 78 is opened and the non-inflammable transfer liquid is injected through the opening 60 until it is seen to overflow from the bleeder valve 78. The plug 62 and gasket 68 are then replaced and the seal wire 70 attached. The journal 24 is now rotated a half turn to bring it to its original position with the semispherical shell 22 again nested in the upper half 18 of the housing. The key 42, gasket 46 and nut 48 are then replaced so as to hold the shell 22 in its upper position. The seal wire 49 is then attached to prevent loosening of the nut 48.

When the pressure is subsequently brought to the desired value in the carburetor, the compartment 54 will be filled with the liquid fuel. This pressure will be transferred through the diaphragm 50 acting against the transfer liquid in the chamber 56, pipe 74 and gauge 76, so as to register the fuel pressure on the gauge. It should be noted that any expansion due to change in altitude or temperature of the transfer liquid will merely result in a shifting of the position of the diaphragm 50.

After the device has been placed in this condition it is obvious that any break in the pipe 74 or the gauge 76, instead of spraying the operator or pilot who may be near the connection, with the liquid fuel, only that portion of the transfer liquid which is entirely within the compartment 56 will be ejected through the break, since as soon as the fuel pressure has seated the diaphragm 50 over the bottom of the compartment 56 no more of the transfer liquid will be ejected. Since this liquid is preferably non-inflammable, no serious harm can occur from such a break.

Having thus described my invention, I claim:

1. In a fluid pressure system of the class which comprises a pressure gauge, a source of pressure to be gauged, a safety housing, a flexible diaphragm normally intermediate the end walls of said housing separating said housing into a gauge compartment and a pressure source compartment, a passageway connecting said pressure source to said pressure source compartment, a passageway connecting said gauge to said gauge compartment, and a filler passageway communicating with said gauge compartment and said gauge; the improvement in said system which comprises a supporting means for said flexible diaphragm in the form of a hemispheroidal cup pivotally supported on the sphere axis and rotatable thereon to an inoperative position wherein the open side of the cup is toward the diaphragm, and rotatable to an operative position one-hundred eighty degrees from the inoperative position, and means for rotating said supporting means from one of its positions to the other.

2. The improvement defined in claim 1 wherein the means for rotating the supporting means is accessible from the outside of the housing.

3. The improvement defined in claim 1 with a locking means accessible from the outside of the housing for selectively locking said supporting means in either of its positions.

DAVID SAMIRAN.